(12) United States Patent
Hollinger (10) Patent No.: US 12,503,290 B2
(45) Date of Patent: Dec. 23, 2025

(54) BLISTER PACKAGES CONTAINING ACTIVE MATERIAL AND METHODS OF MAKING AND USING SAME

(71) Applicant: CSP Technologies, Inc., Auburn, AL (US)

(72) Inventor: James Hollinger, Auburn, AL (US)

(73) Assignee: CSP Technologies, Inc., Auburn, AL (US)

( * ) Notice: Subject to any disclaimer, the term of this patent is extended or adjusted under 35 U.S.C. 154(b) by 189 days.

(21) Appl. No.: 18/497,502

(22) Filed: Oct. 30, 2023

(65) Prior Publication Data

US 2024/0059468 A1 Feb. 22, 2024

Related U.S. Application Data

(63) Continuation of application No. PCT/US2022/072152, filed on May 6, 2022.
(Continued)

(51) Int. Cl.
*B65D 75/30* (2006.01)
*B29D 22/00* (2006.01)
(Continued)

(52) U.S. Cl.
CPC ......... *B65D 75/327* (2013.01); *B29D 22/003* (2013.01); *B32B 15/082* (2013.01); *B32B 15/20* (2013.01); *B65D 65/40* (2013.01); *B65D 81/267* (2013.01); *B29K 2027/06* (2013.01); *B29K 2105/256* (2013.01); *B32B 2311/24* (2013.01);
(Continued)

(58) Field of Classification Search
CPC ......... B29C 59/00; B29C 59/02; B29C 59/04; B29C 48/00; B29C 51/00; B65D 75/32; B65D 75/58; B65D 75/36; B65D 75/327; B65D 65/40; B65D 81/26; B65D 81/267; B65D 2575/3218; B29D 22/003;
(Continued)

(56) References Cited

U.S. PATENT DOCUMENTS 5,911,937 A 6/1999 Hekal
6,080,350 A 6/2000 Hekal
(Continued)

FOREIGN PATENT DOCUMENTS

DE 44 02 038 A1 7/1995
WO 2020/061406 A1 3/2020

OTHER PUBLICATIONS

Espacenet machine translation of DE4402038A1; https://translationportal.epo.org/emtp/translate/?ACTION=description-retrieval&COUNTRY=DE&ENGINE=google&FORMAT=docdb&KIND=A1&LOCALE=en_EP&NUMBER=4402038&OPS=ops.epo.org/3.2&SRCLANG=de&TRGLANG=en (Year: 1995).*
(Continued)

*Primary Examiner* — Leslie A Nicholson, III
(74) *Attorney, Agent, or Firm* — Mark T. Vogelbacker; Eckert Seamans Cherin & Mellott LLC (57) ABSTRACT

A blister pack including a backing and an active layer coextensively attached to the backing. A cover is attached to the layer. The cover forms one or more spaced-apart blisters. Each blister and the layer combine to form a cavity configured to enclose at least one product. The active layer within each blister is embossed to form one or more points of weakness configured to facilitate rupture of the backing and active layer when dispensing a product from the blister.

20 Claims, 5 Drawing Sheets

Related U.S. Application Data (60) Provisional application No. 63/201,621, filed on May 6, 2021.

(51) Int. Cl.
  *B32B 15/082* (2006.01)
  *B32B 15/20* (2006.01)
  *B65D 65/40* (2006.01)
  *B65D 75/32* (2006.01)
  *B65D 81/26* (2006.01)
  *B29K 27/06* (2006.01)
  *B29K 105/00* (2006.01)

(52) U.S. Cl.
  CPC .. *B32B 2439/40* (2013.01); *B65D 2575/3218* (2013.01)

(58) Field of Classification Search
  CPC .......... B29K 2027/06; B29K 2105/256; B32B 2311/24; B32B 2439/40; B32B 15/20; B32B 15/082
  See application file for complete search history.

(56) References Cited

U.S. PATENT DOCUMENTS

| | | | |
|---|---|---|---|
| 6,124,006 A | 9/2000 | Hekal | |
| 6,130,263 A | 10/2000 | Hekal | |
| 6,194,079 B1 | 2/2001 | Hekal | |
| 6,214,255 B1 | 4/2001 | Hekal | |
| 6,279,736 B1 * | 8/2001 | Hekal | F26B 21/083 428/35.8 |
| 6,486,231 B1 | 11/2002 | Hekal | |
| 6,708,825 B2 * | 3/2004 | Filion | B65D 75/327 206/532 |
| 7,005,459 B2 | 2/2006 | Hekal | |
| 7,395,928 B2 * | 7/2008 | Bertsch | B65D 75/327 206/532 |
| 7,641,050 B2 * | 1/2010 | Klatt | B65D 5/5011 206/538 |
| 8,142,603 B2 | 3/2012 | Sagona et al. | |
| 9,439,832 B2 * | 9/2016 | Trombley | A61J 1/035 |
| 9,850,051 B2 * | 12/2017 | Rossi | A61J 1/035 |
| 11,745,926 B2 * | 9/2023 | Hogan | B32B 7/12 206/467 |
| 2007/0241552 A1 * | 10/2007 | Watson | B65D 75/367 283/81 |
| 2011/0079531 A1 | 4/2011 | Yildirim et al. | |
| 2011/0266189 A1 | 11/2011 | Tom et al. | |
| 2016/0039955 A1 | 2/2016 | Klein et al. | |
| 2016/0257438 A1 | 9/2016 | Van Landeghem et al. | |
| 2020/0016034 A1 | 1/2020 | Voellmicke | |

OTHER PUBLICATIONS

International Search Report issued in PCT/US2022/072152, mailed Aug. 18, 2022.
Written Opinion issued in PCT/US2022/072152, mailed Aug. 18, 2022.

* cited by examiner

BLISTER PACKAGES CONTAINING ACTIVE MATERIAL AND METHODS OF MAKING AND USING SAME

CROSS-REFERENCE TO RELATED APPLICATIONS

This application is a continuation of PCT/US2022/072152, filed May 6, 2022, and titled "BLISTER PACKAGES CONTAINING ACTIVE MATERIAL AND METHODS OF MAKING AND USING SAME", which claims priority to U.S. Provisional Patent Application No. 63/201,621, entitled "BLISTER PACKAGES CONTAINING ACTIVE MATERIAL AND METHODS OF MAKING AND USING SAME," filed on May 6, 2021, the contents of each of which are incorporated herein by reference in their entirety.

FIELD

The presently disclosed technology relates to blister packages for solid dose products, such as one or more pills, tablets, capsules and the like. Each package has a cover, which can be optionally formed of a thermoformed material, bonded to backing, which can optionally include an aluminum foil component.

BACKGROUND AND DESCRIPTION OF RELATED ART

Blister packaging is commonly used to package oral solid dose medications, vitamins, probiotics, pills, tablets, capsules, and the like. Prior art packaging includes a thermoformed material, which holds the product, and a foil attached to an open side thereof to enclose the product. Blister packaging or "blister packs" are typically used both by pharmaceutical companies and smaller health care facilities. Blister packs are also manufactured by companies in the business of providing the packages or components thereof in untilled form, for filling by third parties.

It is known to place a desiccant or scavenger extruded film in a blister pack. The size and shape of the desiccant or scavenger extruded film may be referred to as the footprint of the film, and in the prior art is typically at least slightly less than the opening of the blister containing the product.

One prior art blister package with desiccant film is disclosed in U.S. Pat. No. 6,279,736 (Hekal), which is hereby incorporated by reference herein in its entirety.

It is also known to attach (e.g., via heat staking) a specifically sized active member, including a desiccant or scavenger or the like, to a backing of a blister pack within each blister of the blister package. One such blister package is disclosed in U.S. Publication No. 2020/0016034 (Voellmicke), which is hereby incorporated herein by reference in its entirety.

In the prior art, blister packs including an active member would typically have the active member cut and placed in a portion of the base of each blister cavity. In this way, the cover would seal directly to the backing without an intermediate layer of active film sandwiched between the backing and cover. This configuration could be regarded as beneficial to ensuring a moisture or gas tight seal to protect a product in each blister cavity. On the other hand, the process requires specialized equipment such as film application modules, which would be needed to cut and place pieces of film with precision to the backing at the location of each blister. Some fillers and package makers cannot fit or justify the expense of such equipment and processes in their packaging lines. Also, production in this manner takes more time. Accordingly, there is a need to increase the speed and efficiency while lowering the cost of producing blister packs with active film in each blister.

BRIEF SUMMARY

The presently disclosed technology satisfies the needs set forth above.

In one aspect, the disclosed concept includes a composite that include a backing and an active layer attached coextensively to the backing. The active layer is embossed to form one or more points of weakness. Optionally, the active layer has a thickness, wherein the one or more points of weakness extend through at least some of the thickness, but do not extend into the backing.

In another aspect, the disclosed concept includes a blister pack made in part from the composite described herein. The blister pack further includes a cover attached to the active layer, the cover forming one or more spaced apart blisters. A portion of the active layer within each blister defines an active layer floor, the active layer floor and the blister combining to form a cavity configured to enclose at least one product. The active layer floor comprises the one or more points of weakness. Optionally, the active layer floor and the blister meet to form a periphery, the one or more points of weakness being located at or adjacent to the periphery. Optionally, the active layer floor and a portion of the backing beneath the active layer floor form an openable portion of the composite. The one or more points of weakness are configured to cause the openable portion of the composite to rupture in response to application of sufficient force within the cavity in a direction towards the active layer floor, thereby allowing a user to remove the product from the cavity.

Optionally, in any embodiment of the blister pack, the backing is formed of foil.

Optionally, in any embodiment of the blister pack, the cover is formed of thermoplastic. Optionally, the cover is formed of at least one of a thermoformed film and transparent polyvinyl chloride (PVC).

Optionally, in any embodiment of the blister pack, the active layer includes at least one of a desiccant and an oxygen scavenger.

Optionally, in any embodiment of the blister pack, the active layer includes a base material in the form of a thermoplastic polymer with an active agent dispersed therein (entrained polymer), optionally with a channeling agent.

In another aspect, the disclosed concept includes a method of making a composite. The method includes attaching a layer including an active agent to a foil backing and embossing the layer to form one or more points of weakness therein. Optionally, the one or more points of weakness extend through at least some of the layer's thickness, but do not extend into the backing. Optionally, the layer is heated during embossing. Preferably, the active layer is coextensive with the foil backing. In an optional aspect of this method, the layer is embossed when the composite enters between two adjacent rollers of a roll stack, a first roller having one or more raised impressions spaced apart to emboss a portion of the layer with one or more points of weakness, and a second roller having a smooth surface.

In another aspect, the disclosed concept includes a method of dispensing a product from any embodiment of the blister pack described herein. In this method, a user applies sufficient force within the cavity in a direction towards the active layer floor such that the one or more points of weakness perforate and cause the openable portion of the composite to rupture, allowing the product to exit the blister through the openable portion of the composite.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown.

In the Drawings.

DETAILED DESCRIPTION

While systems, devices and methods are described herein by way of examples and embodiments, those skilled in the art recognize that the presently disclosed technology is not limited to the embodiments or drawings described. Rather, the presently disclosed technology covers all modifications, equivalents and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. As used herein, the word "may" is used in a permissive sense (i.e., meaning having the potential to) rather then the mandatory sense (i.e., meaning must). Unless specifically set forth herein, the terms "a," "an" and "the" are not limited to one element but instead should be read as meaning "at least one." The terminology includes the words noted above, derivatives thereof and words of similar import.

Figure 1:
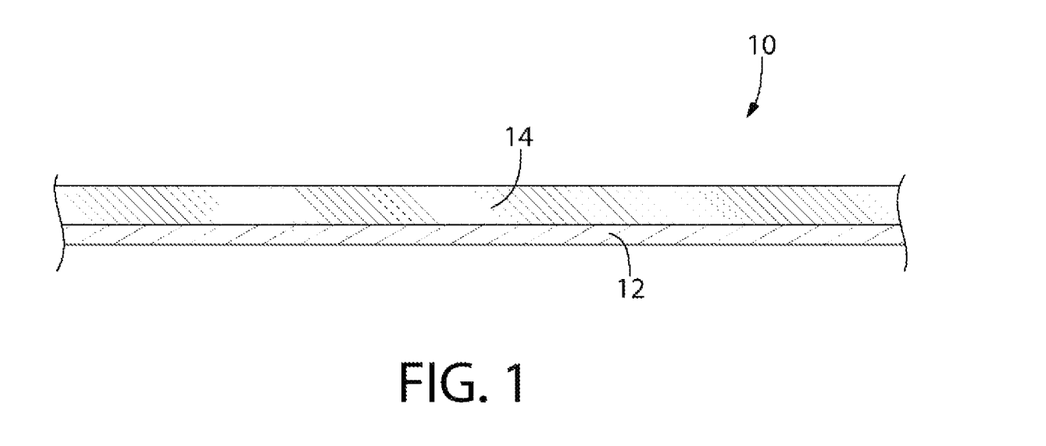
FIG. 1 is a cross sectional view of a composite prior to being embossed according to an aspect of the disclosed concept.

Blister packs according to an aspect of the disclosed concept may include a backing made from a composite comprising at least two layers and a cover attached to the composite. Referring now in detail to the various figures, wherein like reference numerals refer to like parts throughout, there is shown in FIG. 1 an embodiment of an unfinished composite 10, which, when further processed according to methods disclosed herein, may be used as a component of a blister pack according to the disclosed concept. The composite 10 is a multilayer structure comprising at least two layers: a backing 12 and an active layer 14 attached coextensively to the backing 12. The backing 12 and active layer 14 may be attached, for example, through heat staking or lamination. The process of heat staking active film onto a substrate is described in detail in U.S. Pat. No. 8,142,603, which is incorporated herein by reference in its entirety. The active layer 14 is configured to preserve quality or stability of a product stored within a blister of a blister pack, as further discussed below. By attaching the active layer 14 coextensively to the backing 12, the need for precision cutting and placement of pieces of active film onto the backing (e.g., as described in the prior art) is obviated, simplifying the process of forming a blister pack.

Optionally, the active layer 14 can be in the form of an extruded film, such as a desiccant entrained polymer film or an oxygen scavenger entrained polymer film. Optionally, the active layer 14 can be in the form of a rectangular or square piece of film, which mimics or matches at least the shape and/or size of the backing 12, thus making the two materials coextensive with each other. However, the active layer 14 is not limited to the particular size, shape and/or configuration shown and described herein, as other shapes, for example, can be employed.

Optionally, the active layer 14 contains a desiccant. This would be an embodiment where moisture absorption is desired. However, where moisture absorption is not desired, the active layer 14 may include one or more alternative active agents. For example, in another embodiment, the active layer 14 contains a material selected from the group consisting of activated carbon, carbon black, ketcham black, and diamond powder. In a further embodiment, an active agent including one or more sublayers or components of the active layers 14 contains a material such as absorption microspheres, $BaTiO_3$, $SrTiO_3$, $SiO_2$, $Al_2O_3$, ZnO, $TiO_2$, MnO, CuO, $Sb_2O_3$, silica, calcium oxide and ion exchange resins. In yet another embodiment, an absorbing or adsorbing agent containing sublayer of the active layer 14 contains two or more types of absorbing or adsorbing agents. The suitable absorbing or adsorbing agent is chosen so as to achieve absorption or adsorption of the desired vapor or gas for the desired end use (e.g., absorption or adsorption of moisture, oxygen, carbon dioxide, nitrogen or other undesired gases or vapors).

The active layer 14 (whether containing desiccant, oxygen scavenger, a releasing material or agent, etc., or combination thereof) is capable of acting on, interacting with or reacting with a selected material (e.g., moisture or oxygen). Examples of such actions or interactions may include absorption, adsorption (sorption, generally) or release of the selected material.

The active layer 14 can include the active agent dispersed in a base material. The active agent (i) can be immiscible with the base material (e.g., polymer) and when mixed and heated with the base polymer and an optional channeling agent, will not melt, i.e., has a melting point that is higher than the melting point for either the base polymer or the channeling agent, and/or (ii) acts on, interacts or reacts with a selected material. The term "active agent" may include but is not limited to materials that absorb, adsorb, or release the selected material(s). Active agents according to the presently disclosed technology may be in the form of particles such as minerals (e.g., molecular sieve or silica gel, in the case of desiccants), but the presently disclosed technology should not be viewed as limited only to particulate active agents. For example, in some embodiments, an oxygen scavenging formulation may be made from a resin which acts as, or as a component of, the active agent.

As used herein, the term "base material" is a component (preferably a polymer) of an entrained active material, other than the active agent, that provides structure for the entrained material.

As used herein, the term "base polymer" is a polymer optionally having a gas transmission rate of a selected material that is substantially lower than, lower than or substantially equivalent to, that of the channeling agent. By way of example, such a transmission rate would be a water vapor transmission rate in embodiments where the selected material is moisture and the active agent is a moisture absorbing or adsorbing desiccant. The primary function of the base polymer is to provide structure for the entrained polymer. Suitable base polymers may include thermoplastic polymers, e.g., polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylonitrile, polysulfones, polyacrylic ester, acrylic, polyurethane and polyacetal, or copolymers or mixtures thereof.

Referring to such a comparison of the base polymer and channeling agent water vapor transmission rate, in one embodiment, the channeling agent has a water vapor transmission rate of at least two times that of the base polymer. In another embodiment, the channeling agent has a water vapor transmission rate of at least live times that of the base polymer. In another embodiment, the channeling agent has a water vapor transmission rate of at least ten times that of the base polymer. In still another embodiment, the channeling agent has a water vapor transmission rate of at least twenty times that of the base polymer. In still another embodiment, the channeling agent has a water vapor transmission rate of at least fifty times that of the base polymer. In still another embodiment, the channeling agent has a water vapor transmission rate of at least one hundred times that of the base polymer.

As used herein, the term "channeling agent" or "channeling agents" is defined as a material that is immiscible with the base polymer and has an affinity to transport a gas phase substance at a faster rate than the base polymer. Optionally, a channeling agent is capable of forming channels through the entrained polymer when formed by mixing the channeling agent with the base polymer. Optionally, such channels are capable of transmitting a selected material through the entrained polymer at a faster rate than in solely the base polymer. Preferably, the channeling agent is a polymer material.

As used herein, the term "channels" or "interconnecting channels" is defined as passages formed of the channeling agent that penetrate through the base polymer and may be interconnected with each other.

As used herein, the term "entrained polymer" is defined as a monolithic material formed of at least a base polymer with an active agent and optionally also a channeling agent entrained or distributed throughout. An entrained polymer thus includes two-phase polymers and three phase polymers. A "mineral loaded polymer" is a type of entrained polymer, wherein the active agent is in the form of minerals, e.g., mineral particles such as molecular sieve or silica gel. The term "entrained material" is used herein to connote a monolithic material comprising an active agent entrained in a base material wherein the base material may or may not be polymeric.

As used herein, the term "monolithic," "monolithic structure" or "monolithic composition" is defined as a composition or material that does not consist of two or more discrete macroscopic layers or portions. Accordingly, a "monolithic composition" does not include a multi-layer composite.

As used herein, the term "phase" is defined as a portion or component of a monolithic structure or composition that is uniformly distributed throughout, to give the structure or composition it's monolithic characteristics.

As used herein, the term "selected material" is defined as a material that is acted upon, by, or interacts or reacts with an active agent and is capable of being transmitted through the channels of an entrained polymer. For example, in embodiments in which a desiccant is used as an active agent, the selected material may be moisture or a gas that can be absorbed by the desiccant. In embodiments in which a releasing material is used as an active agent, the selected material may be an agent released by the releasing material, such as moisture, fragrance, or an antimicrobial agent (e.g., chlorine dioxide). In embodiments in which an adsorbing material is used as an active agent, the selected material may be certain volatile organic compounds and the adsorbing material may be activated carbon.

As used herein, the term "three phase" is defined as a monolithic composition or structure comprising three or more phases. An example of a three phase composition according to the presently disclosed technology would be an entrained polymer formed of a base polymer, active agent, and channeling agent. Optionally, a three phase composition or structure may include an additional phase, e.g., a colorant.

Entrained polymers may be two phase formulations (i.e., comprising a base polymer and active agent, without a channeling agent) or three phase formulations (i.e., comprising a base polymer, active agent and channeling agent). Entrained polymers are described, for example, in U.S. Pat. Nos. 5,911,937, 6,080,350, 6,124,006, 6,130,263, 6,194,079, 6,214,255, 6,486,231, 7,005,459, and U.S. Pat. Pub. No. 20160039955, each of which is incorporated herein by reference in its entirety.

An entrained material or polymer includes a base material (e.g., polymer) for providing structure, optionally a channeling agent and an active agent. The channeling agent forms microscopic interconnecting channels through the entrained polymer. At least some of the active agent is contained within these channels, such that the channels communicate between the active agent and the exterior of the entrained polymer via microscopic channel openings formed at outer surfaces of the entrained polymer. The active agent can be, for example, any one of a variety of absorbing, adsorbing or releasing materials, as described in further detail below. While a channeling agent is preferred for many applications, the invention broadly includes entrained materials that optionally do not include channeling agents, e.g., two phase polymers.

In any embodiment, suitable channeling agents may include a polyglycol such as polyethylene glycol (PEG), ethylene-vinyl alcohol (EVOH), polyvinyl alcohol (PVOH), glycerin polyamine, polyurethane and polycarboxylic acid including polyacrylic acid or polymethacrylic acid. Alternatively, the channeling agent can be, for example, a water insoluble polymer, such as a propylene oxide polymerisate-monobutyl ether, such as Polyglykol B01/240, produced by CLARIANT. In other embodiments, the channeling agent could be a propylene oxide polymerisate monobutyl ether, such as Polyglykol B01/20, produced by CLARIANT, propylene oxide polymerisate, such as Polyglykol D01/240, produced by CLARIANT, ethylene vinyl acetate, nylon 6, nylon 66, or any combination of the foregoing.

Suitable active agents according to the presently disclosed technology include absorbing materials, such as desiccating compounds. If the active agent is a desiccant, any suitable desiccant for a given application may be used. Typically, physical absorption desiccants are preferred for many applications. These may include molecular sieves, silica gels, clays and starches. Alternatively, the desiccant may be a chemical compound that forms crystals containing water or compounds which react with water to form new compounds.

Optionally, in any embodiment, the active agent may be an oxygen scavenger, e.g., an oxygen scavenging resin formulation.

Figure 2:
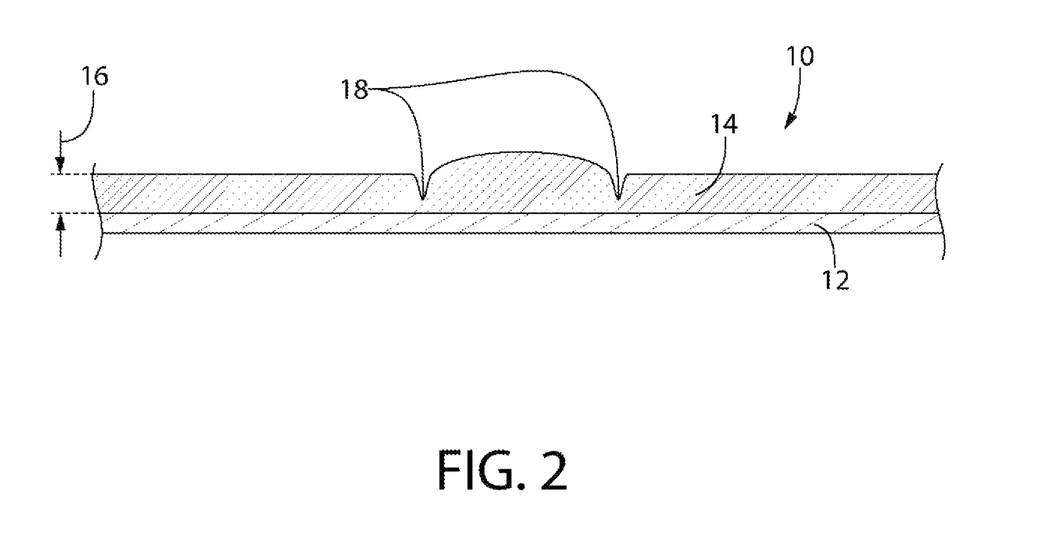
FIG. 2 is a cross sectional view of the composite of FIG. 1 that has been embossed according to an aspect of the disclosed concept.

As shown in FIG. 2, once the composite 10 has undergone further processing (a nonlimiting example of which is disclosed below), the active layer 14 includes one or more points of weakness 18. Optionally, the active layer 14 has a thickness 16 and the one or more points of weakness 18 extend through at least some of the thickness 16, but do not extend through the entire thickness 16 and do not extend into the backing 12. In other words, the one or more points of weakness 18 optionally extend through a portion of, but not the entirety of, the thickness 16. Alternatively, the one or more points of weakness 18 may extend through the entirety of the thickness 16, but still do not extend into the backing 12.

The one or more points of weakness 18 in the active layer 14 may be formed by embossing the active layer 14. Optionally, when viewed from above, the one or more points of weakness 18 can form a circle, for example. Embossing the active layer 14 to form the one or more points of weakness 18 may optionally be carried out using a roll stack 20, such as that shown in FIG. 3. The roll stack 20 comprises a frame 26 to which two or more rollers are rotationally secured. For example, the roll stack 20 may include two adjacent rollers, one of which is a first roller 22 and the other of which is a second roller 24. In the embodiment shown, the first roller 22 is positioned above the second roller 24; however, it is also within the scope of the disclosed concept for the first roller to be positioned below or otherwise directly next to the second roller, regardless of direction. Thus, the first roller 22 and second roller 24 are vertically adjacent to each other, with only a narrow gap 30 between them. Optionally, the narrow gap 30 is less than 5 mm, optionally less than 4 mm, optionally less than 3 mm, optionally less than 2 mm, optionally less than 1 mm, optionally from 0.2 mm to 2 mm, optionally from 0.2 mm to 1.5 mm. Each roller 22, 24 is rotationally mounted to a spindle 28 secured to the frame 26. Either or both rollers 22, 24 may be driven by a motor causing them to rotate about their respective central axes. Preferably, the rollers 22, 24 rotate in opposite directions. For example, the first roller 22 may rotate clockwise and the second roller 24 may rotate counterclockwise.

Optionally, the step of embossing the active layer 14 can cause a portion thereof, e.g., such as where a blister would be placed, to have a greater thickness or height than one or more other portions, such as outside of the area where the blister would be placed or created. The greater thickness or height would be created by displacement of material of the active layer 14.

Figure 3:
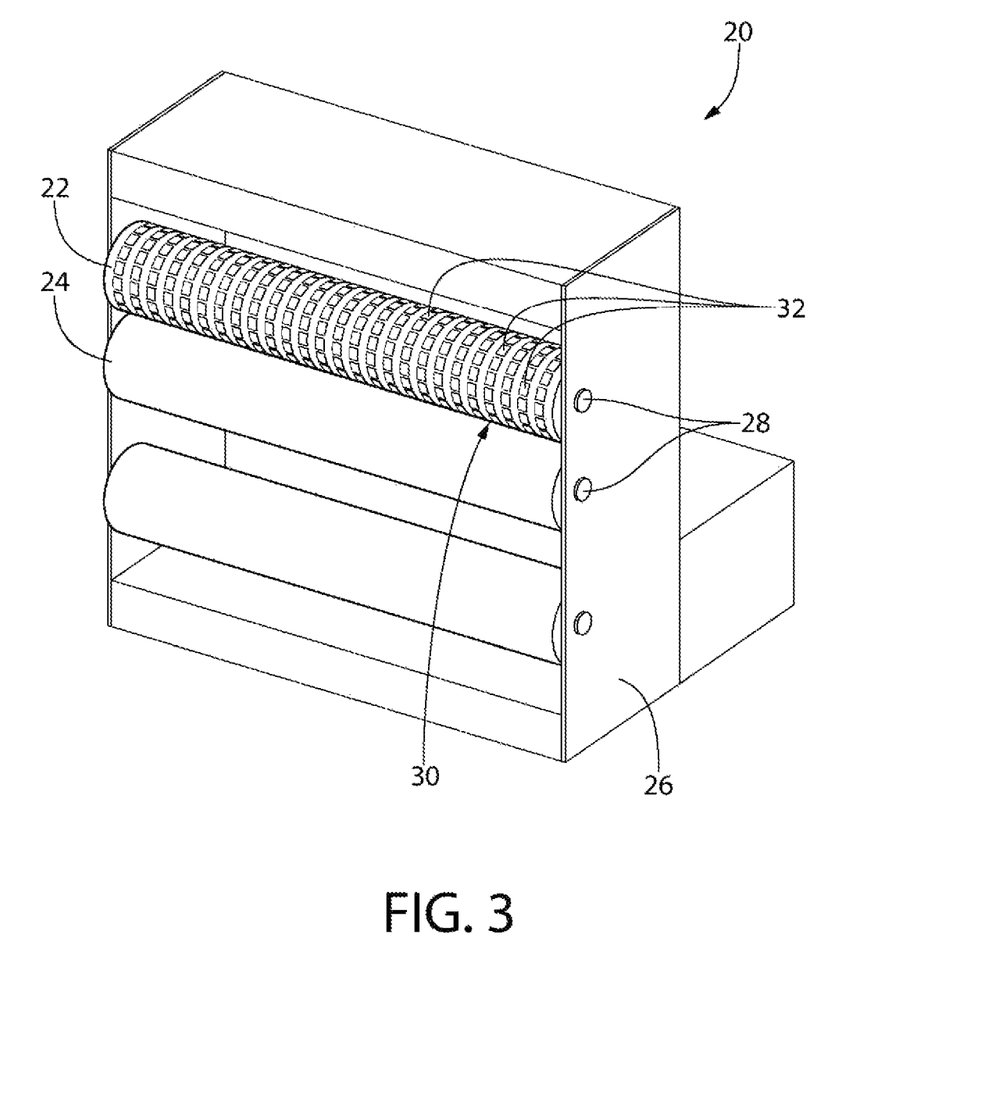
FIG. 3 is a perspective view of a roll stack according to one embodiment of the presently disclosed technology.
Figure 4:
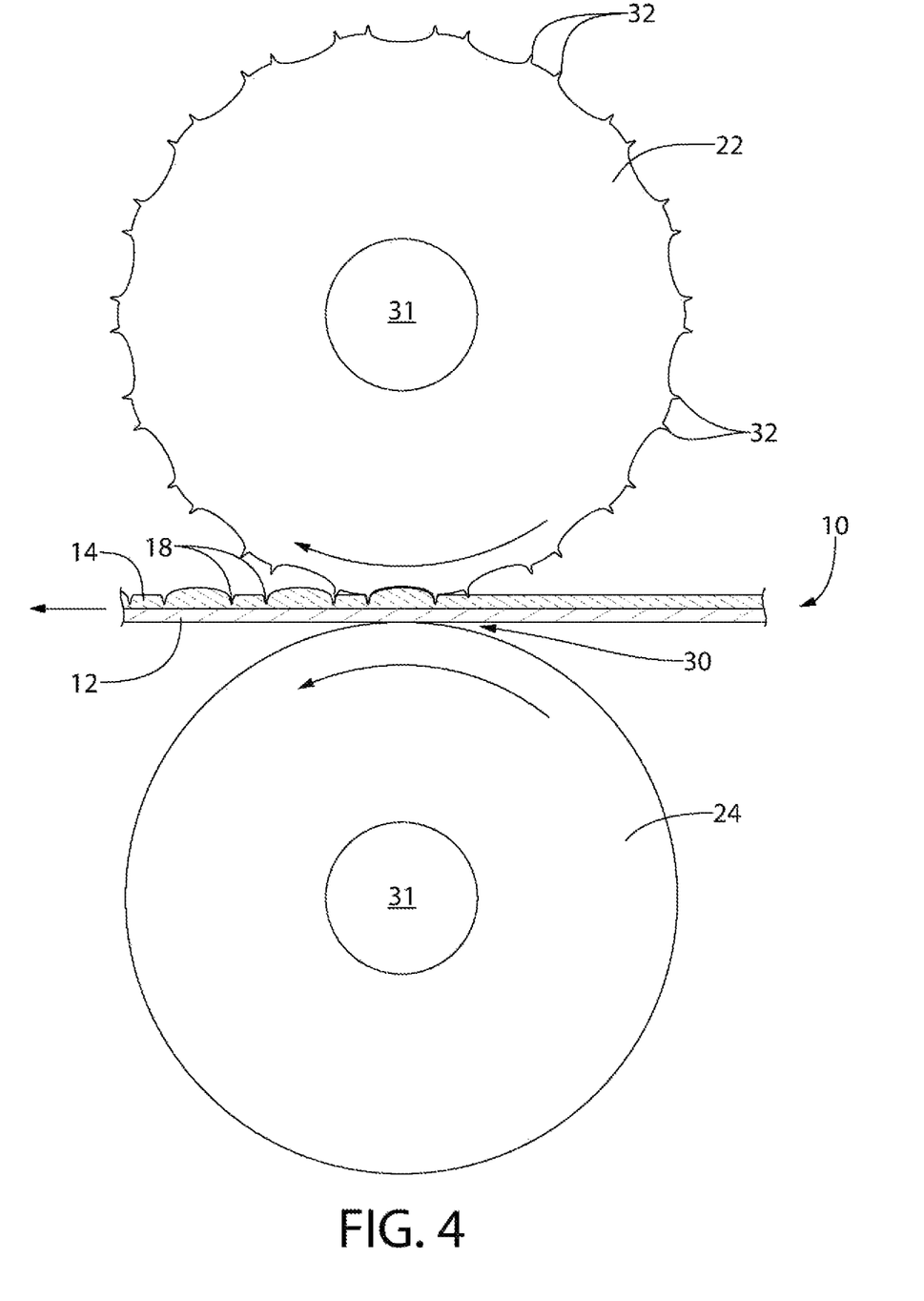
FIG. 4 is a sectional view of the composite of FIG. 1 being fed between two rollers of the roll stack of FIG. 3 to form the composite of FIG. 2.

Referring to FIGS. 3 and 4, the first roller 22 optionally includes a plurality of spaced apart weakness-formers in the form of raised impressions 32 and the second roller 24 optionally has a smooth surface. Each raised impression 32 can be sized, shaped, and/or configured to form the one or more points of weakness 18 described in detail above. The configuration or layout of the raised impressions 32 can be modified or designed to create a particular size, shape, and/or configuration of the one or more points of weakness 18. The configurations shown in FIG. 4 are exemplary and non-limiting.

In one embodiment, each raised impression 32 is a projection or dimple that extends outwardly or inwardly from an exterior surface of the first roller 22. In another optional embodiment, each raised impression 32 is in the form of a continuous ring that extends (e.g., radially) outwardly from the exterior surface of the first roller 22. Optionally, the one or more raised impressions 32 are circular, rectangular or oblong in shape. However, the size, shape, and/or configuration of each raised impression can be modified to create the one or more points of weakness 18 as desired.

In operation, the composite 10 is fed through the narrow gap 30, with the active layer 14 facing the first roller 22 and the backing 12 facing the second roller. Each roller 22, 24 rotates in a direction opposite the other, e.g., the first roller 22 rotates clockwise while the second roller 24 rotates counterclockwise to feed the composite 10 in a direction from right to left. It is contemplated that the composite 10 could alternatively be fed in the opposite direction too, i.e., left to right. In either case, the composite 10 is fed into an entrance of the narrow gap 30, is sandwiched between the rollers 22, 24 during embossing, and is dispensed through an exit of the narrow gap 30. As the composite 10 is fed through the narrow gap 30, the raised impressions 32 penetrate at least a portion of the active layer 14, as described above, thereby embossing and creating the points of weakness 18 in the active layer 14. Thus, the composite 10 prior to entering the narrow gap 30 is in the configuration shown in FIG. 1 and the composite 10 after being dispensed through the exit of the narrow gap 30 is in the configuration shown in FIG. 2.

Optionally, in any embodiment, the active layer 14 is heated during embossing to soften the active layer 14, allowing the raised impressions 32 to penetrate a portion of it more readily. Heating may also allow the active layer 14 to remain consistent in thickness on either side of the points of weakness 18.

Optionally, in any embodiment, the backing 12 is a foil backing. Preferably, in any embodiment, the active layer 14 is coextensive with the foil backing 12.

Figure 5:
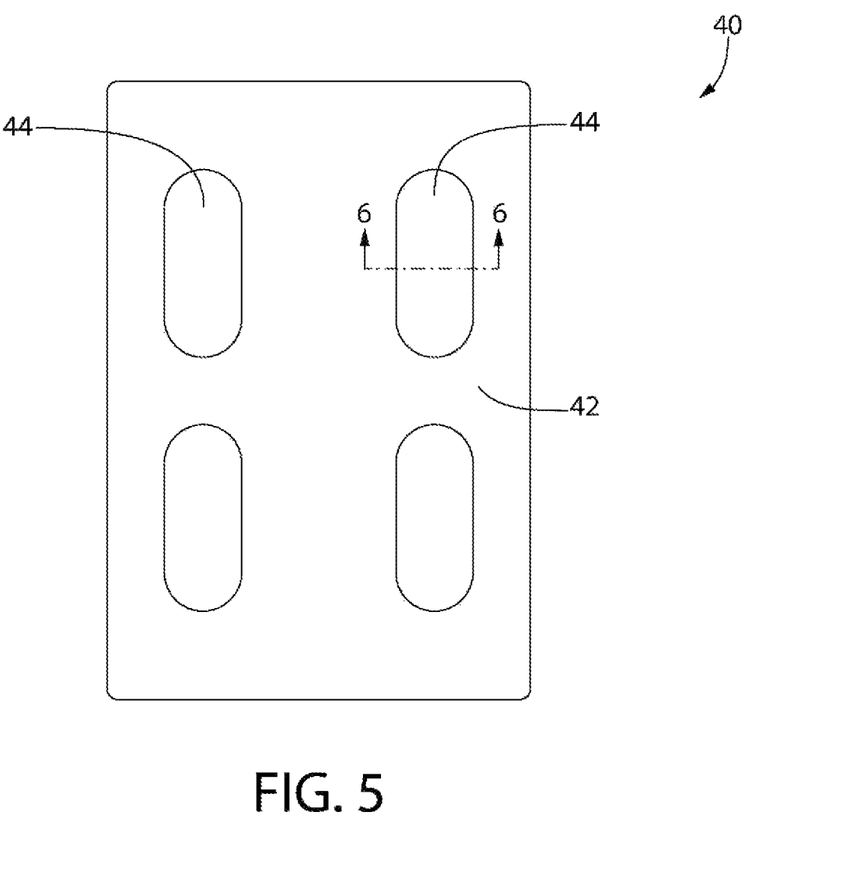
FIG. 5 is a top plan view of an optional blister pack according to an aspect of the disclosed concept.
Figure 6:
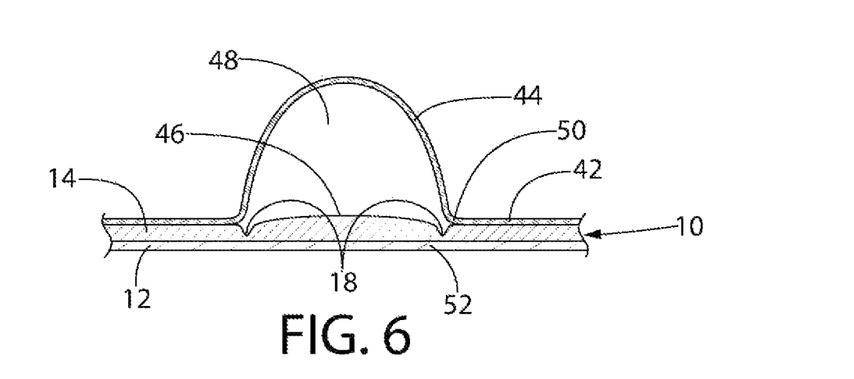
FIG. 6 is a cross-sectional view through line 6-6 of FIG. 5, showing a blister cavity of the blister pack of FIG. 5.

Referring now to FIGS. 5 and 6, there is shown an exemplary blister pack 40 according to a nonlimiting embodiment of the disclosed concept. The blister pack 40 can enclose, preserve and protect one or more products, such as oral solid dose medications, vitamins or other nutritional supplements, foodstuff, small consumer goods, probiotics, etc. Such products may be in the form of pills. e.g., tablets, capsules, and the like. The blister pack 40 comprises the composite 10 as a base and a cover 42 attached to the active layer 14 side of the composite 10. The cover 42 forms one or more spaced apart blisters 44. Optionally, each blister 44 can have at least a partial egg shape or a bulbous shape. Optionally, the cover 42 is made or formed of a formable web. In one embodiment, the formable web is made from a thermoplastic material, such as a thermoformed film. Optionally, the cover 42 can be formed of polyvinyl chloride (PVC), which can be transparent or opaque.

A portion of the active layer 14 within each blister 44 defines an active layer floor 46. Together, the active layer floor 46 and blister 44 combine to form a cavity 48 to enclose at least one product, such as a solid dosage form, tablet, capsule or gel cap. The active layer 14 can optionally be configured to contribute to the preservation of a product in each blister 44. For example, the active layer 14 can be configured to absorb and/or adsorb, and/or release material that is designed to preserve and/or extend the shelf-life of the product in each blister 44. The active layer floor 46 includes and/or is surrounded by the one or more points of weakness 18. For each blister 44, the active layer floor 46 and the portion of the cover 42 forming the blister 44 meet to form a periphery 50. Optionally, the one or more points of weakness 18 are located at or adjacent to the periphery 50.

In each blister 44, the active layer floor 46 and a portion of the backing 12 beneath the active layer floor 46 form an openable portion 52 of the composite 10. The one or more points of weakness 18 are configured to cause the openable portion 52 of the composite 10 to rupture in response to application of sufficient force within the cavity 48 in a direction towards the active layer floor 46, thereby allowing a user to remove the product from the cavity 48.

Optionally, in any embodiment of the blister pack 40, the backing 12 is a foil, a plastic material, and/or paperboard. Optionally, in any embodiment of the blister pack 40, the cover 42 is formed of thermoplastic. Optionally, in any embodiment of the blister pack 40, the cover 42 is formed of at least one of a thermoformed film and transparent polyvinyl chloride (PVC). Optionally, in any embodiment of the blister pack 40, the active layer 14 includes at least one of a desiccant, an oxygen scavenger and a humectant. Optionally, in any embodiment of the blister pack 40, each cavity 48 includes at least two spaced-apart points of weakness.

With the one or more points of weakness 18 penetrating at least a portion of the thickness 16 of the active layer 14 but not extending into the backing 12, the openable portion 52 is desirably susceptible to breakage upon application of sufficient deliberate force. But because the backing is fully intact until it is time to dispense the product, the blister 44 maintains closure integrity to enclose and substantially seal and protect the product from the ambient environment.

Optionally, the one or more points of weakness 18 is a single, continuous groove that extends at or near the periphery 50. In an alternative embodiment, the groove of the one or more points of weakness 18 is broken or interrupted by one or more non-embossed sections. In another alternative embodiment, the one or more points of weakness 18 are two or more spaced-apart points.

In one optional aspect, the disclosed concept is directed to a method of making the blister pack 40. The method includes:
providing a composite 10;
providing a thermoformed cover 42 that includes a plurality of blisters 44;
placing a product in each blister 44; and
attaching the cover 42 to the active layer 14, thereby enclosing the product into each of the plurality of blisters 44.

According to the aforementioned method, the one or more points of weakness 18 are configured to cause the openable portion 52 of the composite 10 to rupture in response to application of sufficient force within or to the cavity 48 in a direction towards the active layer floor 46, thereby allowing a user to remove the product from the cavity 48.

Optionally, the cover 42 is attached or adhered. e.g., by thermoforming or cold forming or by ultrasonic welding or attachment, to the top surface of the active layer 14. In one embodiment, energy can be applied through the cover 42 from above to attach the cover 42 to the active layer 14. Optionally, vibration can be applied to the cover 42 to generate heat to attach the cover 42 to the active layer 14.

Figure 7A:
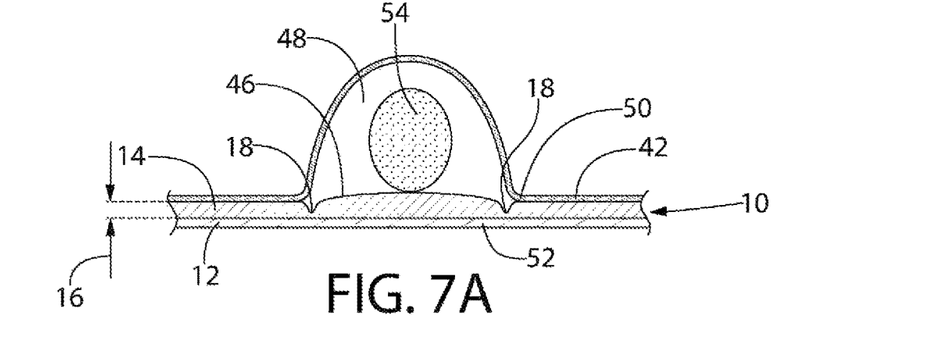
FIGS. 7A-7C show the blister cavity of FIG. 6 partially occupied by an oral dosage product, showing sequentially how the openable portion of the blister composite is ruptured to dispense the product.
Figure 7B:
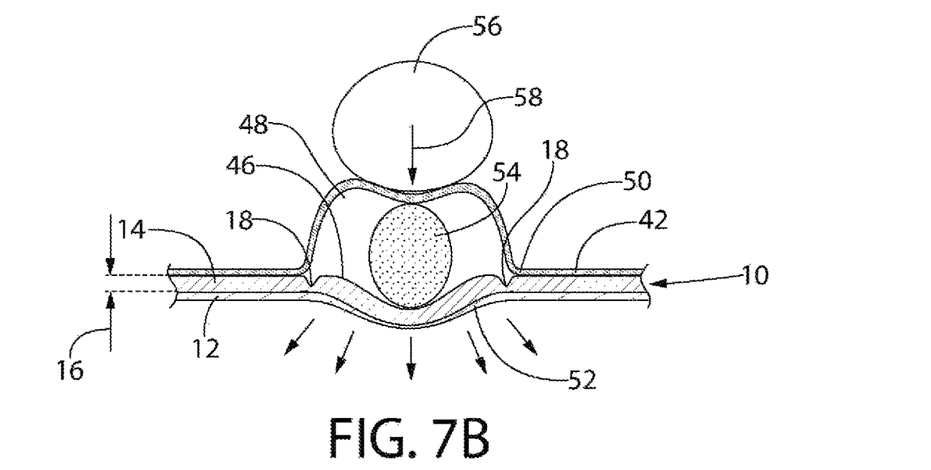
Figure 7C:
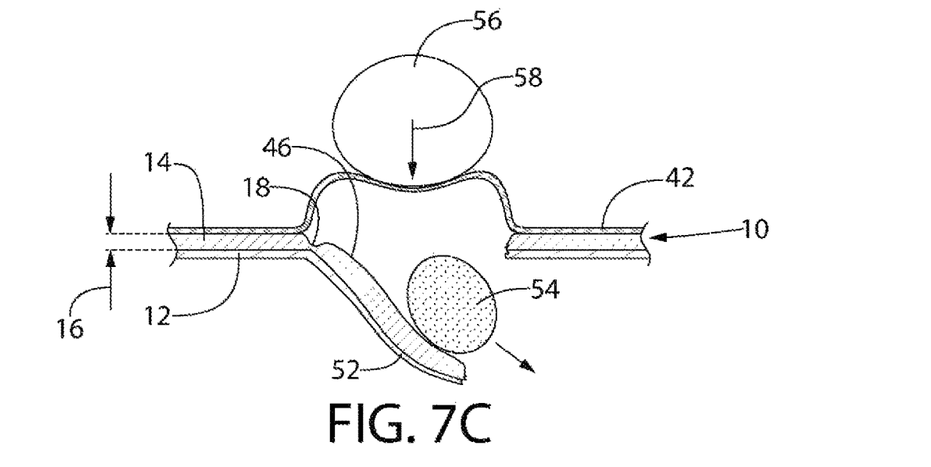

Referring to FIGS. 7A-7C, there is shown the blister pack of FIGS. 5 and 6 with a product 54 stored within a blister 44. FIGS. 7A-7C illustrate a method for dispensing the product 54. Optionally, the product 54 is a pill being one of a medicine, a nutritional supplement or a probiotic. According to the illustrated method for dispensing the product 54, a user applies sufficient force within the cavity 48 in a direction towards the active layer floor 46 such that the one or more points of weakness 18 perforate, causing the openable portion 52 of the composite 10 to rupture. For example, a user may press his or her thumb 56 against the cover 42 on the blister 44, thus applying a force 58 onto the product 54 housed within the blister 44 in the direction of the active layer floor 46. This causes the product 54 to transmit the applied force against the active layer floor 46, which begins to induce the composite 10 to fail at and around the one or more points of weakness 18 (FIG. 7B) until the openable portion 52 ruptures (FIG. 7C), thus allowing the product 54 to exit the blister 44 through the openable portion 52. In this way, the product 54 may be dispensed.

Optionally, the backing 12 can have a first side or surface and an opposing second side or surface. Optionally, at least the first side of the backing 12 is flat or planar. In one embodiment, each of the first and second sides of the backing 12 are flat or planar, such that each of the first and second sides extends in a plane, which are at least slightly spaced-apart.

Optionally, the active layer floor 46 may have a thickness that is consistent with that of surrounding portions of the active layer 14. This may be accomplished, for example, by embossing the active layer at a raised temperature, such that the material of the layer can evenly distribute or reach equilibrium during embossing and formation of points of weakness. Optionally, the layer is molten during the embossing process, so that the material of the active layer is sufficiently mobile to obtain equilibrium or consistency of height or thickness.

Alternatively, the active layer floor 46 may have a thickness that is greater than surrounding portions of the active layer 14. This may be achieved, for example, by embossing the active layer at room temperature or at least well below the material's melting point.

The presently disclosed technology advantageously enables the production of blister packs having active material, e.g., an active film (such as desiccant polymer) within each blister, without the need to separately cut and place each piece of film within each blister.

The following exemplary embodiments further describe optional aspects of the presently disclosed technology and are part of this Detailed Description. These exemplary embodiments are set forth in a format substantially akin to claims, although they are not technically claims of the present application. The following exemplary embodiments refer to each other in dependent relationships as "embodiments" instead of "claims."

1A. A method of preparing to form a blister pack, the method comprising embossing a layer including an active agent.
2A. The method of embodiment 1A, wherein heat is applied during embossing.
3A. The method of embodiment 1A or 2A, wherein the embossing allows a user to remove product from a blister of the plaster pack.
4A. The method of any one of embodiments 1A-3A, wherein a foil backing is laminated to the layer.

5A. The method of any one of embodiments 1A-4A, wherein a cover is thermoformed or cold formed to the layer.

1B. A blister pack including an embossed layer between a cover and a foil backing, the layer including an active agent configured to preserve product held in a blister of the blister pack.

2B. The blister pack of embodiment 1B, wherein embossing is done by projections on a roller of a stack roll stand.

1C. A layer of a blister pack including a two phase formulation, wherein the layer is embossed.

2C. The layer of embodiment 1C, wherein the embossing occurs at ambient temperature.

3C. The layer of embodiment 1C, wherein the embossing occurs at a raised temperature or a predetermined temperature.

1D. A composite for making a blister pack to hold medicinal product, the composite comprising:
a backing; and
an active layer attached coextensively to the backing, wherein the active layer is embossed to form one or more points of weakness.

1F. A method of making a composite for making a blister pack to hold medicinal product, the method comprising:
attaching a layer including an active agent to a foil backing; and
embossing the layer to form one or more points of weakness therein,
wherein the layer and the foil backing are coextensive.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the present presently disclosed technology as defined by the appended claims.

What is claimed is:

1. A composite comprising:
a backing having a first surface and an opposing second surface; and
an active layer having a first surface and an opposing second surface, the second surface of the active layer being attached coextensively to the first surface of the backing, wherein the first surface of the active layer is embossed to form one or more points of weakness.

2. The composite of claim 1, wherein the active layer has a thickness, and wherein the one or more points of weakness extend through at least some of the thickness, but do not extend into the backing.

3. The blister pack of claim 2, wherein the active layer includes at least one of a desiccant and an oxygen scavenger.

4. The blister pack of claim 2, wherein the layer includes a base material in the form of a thermoplastic polymer.

5. The blister pack of claim 2, wherein the cavity includes at least two spaced-apart points of weakness.

6. A blister pack comprising:
the composite of claim 1; and
a cover attached to the active layer of the composite, the cover forming one or more spaced apart blisters, a portion of the active layer within each blister defining an active layer floor, the active layer floor and the blister combining to form a cavity configured to enclose at least one product, wherein the active layer floor comprises the one or more points of weakness.

7. The blister pack of claim 6, wherein the active layer floor and the blister meet to form a periphery, the one or more points of weakness being located at or adjacent to the periphery.

8. The blister pack of claim 6, wherein the active layer floor and a portion of the backing beneath the active layer floor form an openable portion of the composite, and wherein the one or more points of weakness are configured to cause the openable portion of the composite to rupture in response to application of sufficient force within the cavity in a direction towards the active layer floor, thereby allowing a user to remove the product from the cavity.

9. The blister pack of claim 8, wherein the cavity encloses the product, and wherein the product is a pill being one of a medicine, a nutritional supplement, or a probiotic.

10. A method of dispensing a product from the blister pack of claim 9, wherein a user applies sufficient force within the cavity in a direction towards the active layer floor such that the one more points of weakness perforate and cause the openable portion of the composite to rupture, allowing the product to exit the blister through the openable portion of the composite.

11. The blister pack of claim 6, wherein the backing is formed of foil, and wherein the cover is formed of thermoplastic.

12. The blister pack of claim 11, wherein the cover is formed of at least one of a thermoformed film and transparent polyvinyl chloride (PVC).

13. A method of making a composite, the method comprising:
attaching a layer including an active agent to a foil backing; and
embossing a surface of the layer opposite the foil backing to form one or more points of weakness therein.

14. The method of claim 13, wherein the one or more points of weakness extend through at least some of the layer's thickness, but do not extend into the backing.

15. The method of claim 13, wherein the layer is heated during embossing.

16. The method of claim 13, wherein the layer is coextensive with the foil backing.

17. The method of claim 13, wherein the layer is embossed when the composite enters between two adjacent rollers of a roll stack, a first roller having one or more raised impressions spaced apart to emboss a portion of the layer with one or more points of weakness, and a second roller having a smooth surface.

18. A method of making a blister pack, the method comprising:
providing the composite made according to the method of claim 13;
providing a thermoformed cover including a plurality of blisters;
placing a product in each blister of the cover; and
attaching the cover to the layer, thereby enclosing the product into each of the plurality of blisters;
wherein the one or more points of weakness are configured to cause the openable portion of the composite to rupture in response to application of sufficient force within the cavity in a direction towards the active layer floor, thereby allowing a user to remove the product from the cavity.

19. The method of claim 18, wherein the layer is coextensive with the backing, and wherein the layer is coextensive with the cover.

20. The method of claim 13, wherein the embossing is carried out using one or more impressions positioned on a first roll of a stack roll stand.

\* \* \* \* \*